United States Patent [19]
Karasawa et al.

[11] Patent Number: 5,347,535
[45] Date of Patent: Sep. 13, 1994

[54] CDMA COMMUNICATION SYSTEM

[75] Inventors: Yoshio Karasawa; Hisato Iwai, both of Saitama, Japan

[73] Assignee: Kokusai Denshin Denwa Co., Ltd., Tokyo, Japan

[21] Appl. No.: 25,659

[22] Filed: Mar. 3, 1993

[30] Foreign Application Priority Data

Mar. 18, 1992 [JP] Japan ................................ 4-091573

[51] Int. Cl.$^5$ ............................................ H04B 7/04
[52] U.S. Cl. ...................... 375/1; 455/52.3; 455/276.1
[58] Field of Search ............... 375/1; 455/276.1, 65, 455/52.3; 370/18

[56]           References Cited
         U.S. PATENT DOCUMENTS 3,633,107  1/1972  Brady ............................... 455/276.1
4,349,914  9/1982  Evans ............................... 455/136 X

OTHER PUBLICATIONS

"Overview of Cellular CDMA", Lee, IEEE Transactions on Vehicular Technology, vol. 40, No. 2, May 1991, pp. 291–302.

"Introduction to Spread-Spectrum Antimultipath Techniques and Their Application to Urban Digital Radio", Turin, Proceedings of the IEEE, vol. 68, No. 3, Mar. 1980, pp. 328–353.

"Propagation Data and Prediction Methods for the Terrestrial Land Mobile Service Using the Frequency Range 30 MHz to 3 GHz", Rep. 567-4, pp. 310–311, 333–334 and 340.

"Correlation Coefficient on Base Station Diversity for Land Mobile Communication Systems", Kozono et al., Japanese Electronics and Communication, vol. J 70–B, No. 4, Apr. 1987, pp. 476–482.

Primary Examiner—Gilberto Barrón, Jr.
Attorney, Agent, or Firm—Nikaido, Marmelstein, Murray & Oram

[57]           ABSTRACT

A CDMA communication system using a spreading code has a plurality of mobile stations and at least one base station. The mobile stations and the base station are provided with respective receiving sections, each of which has a path diversity function for reducing multipath fading. The base station includes an array antenna having a plurality of integrated antenna elements spaced by a distance substantially equal to one to several wavelengths from each other so as to produce a space diversity effect. A plurality of delay devices are coupled with the respective antenna elements, for applying time delays to signals which pass through the respective antenna elements. The time delay are different from each other by a one symbol period of the spreading code or more.

18 Claims, 6 Drawing Sheets

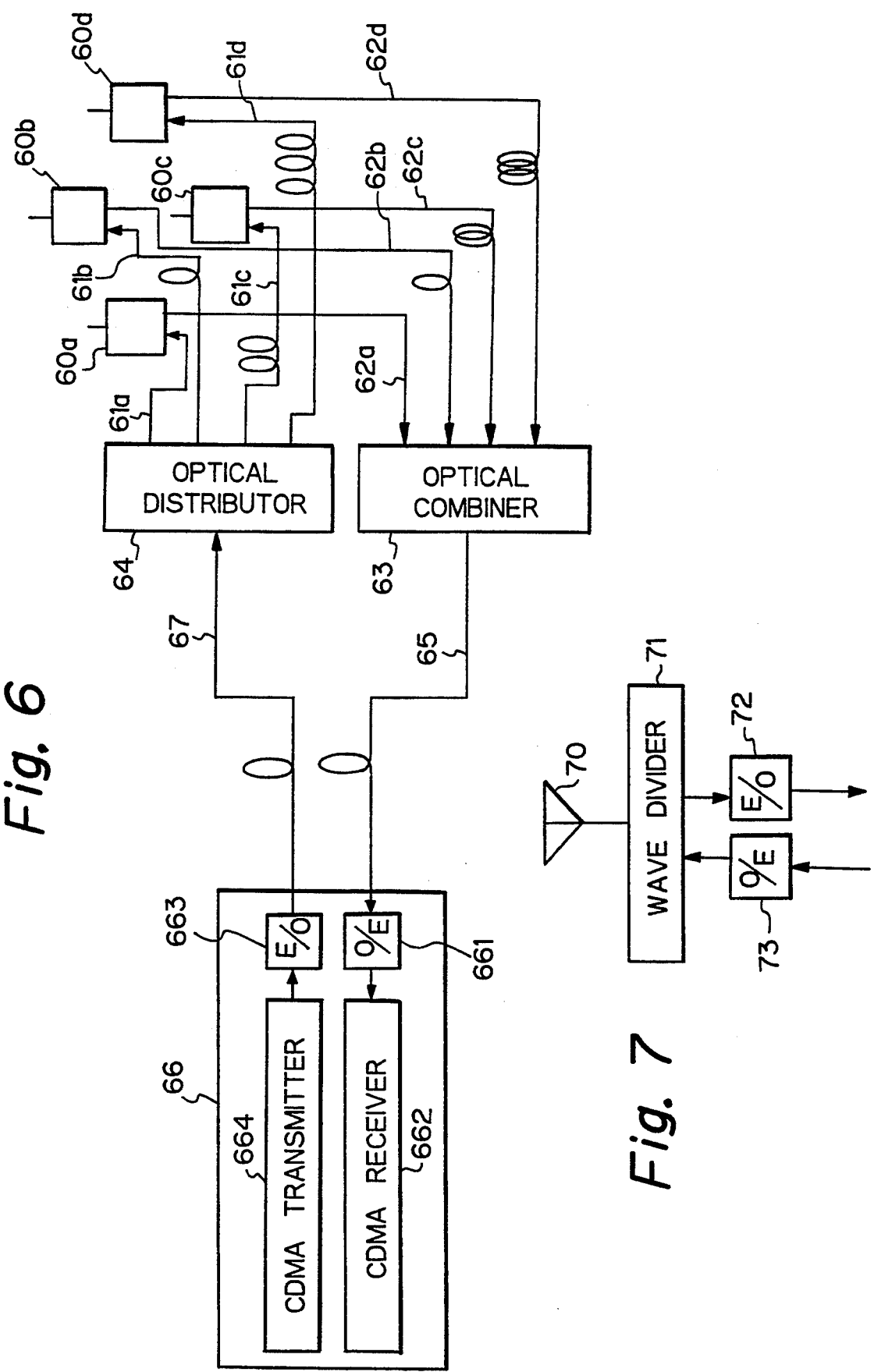

CDMA COMMUNICATION SYSTEM

BACKGROUND OF THE INVENTION

1. Field of the Invention

The present invention relates to a code division multiple access (CDMA) radio communication system, such as wireless private branch exchange (PBX) and microcellular mobile communications, particularly to a CDMA radio communication system in which constitution of an antenna in a base station is improved.

2. Description of the Related Art

In digital communication systems, there are three basic multiple access schemes, CDMA, frequency division multiple access (FDMA), and time division multiple access (TDMA). Since CDMA exhibits great advantages about privacy communication function and an extensibility of system construction over FDMA and TDMA, it will come into use widely in portable radio telephone systems and in microcellular mobile communication systems.

As is well known, in the CDMA systems, the spectrum of signals to be transmitted is spread by pseudorandom noise (PN) codes. Under a condition that the spread bandwidth of the transmitted signal in the spectrum spread system is sufficiently wider than a correlation bandwidth in the transmission path which will be accompanied with multipath fading, the fading can be reduced by using a path diversity system such as a RAKE system or a post detection integrator (PDI) system. Such a RAKE system is described in "Introduction to Spread-Spectrum Antimultipath Technics and Their Application to Urban Digital Radio", by George L. Turin, Proceedings of the IEEE, Vol.68, No.3, Mar. 1980 in detail.

At the receiving end of the CDMA system, a correlation between the received signal and a PN code used for spreading the signal to be transmitted in the particular transmitting end will be calculated by a correlator, and thus output of the correlator will have a resolution of time which corresponds to a symbol period of the spreading code. The output of the correlator is applied to a delay line having a plurality of (TDL; tapped delay line). A plurality of outputs appear at certain taps of tile delay line depending upon the different delay amounts caused by multipath are, according to the RAKE system, weighted by values which are proportional to strength of the respective paths and combined together (maximal-ratio combining). Since there is no correlation between the variations of the scattered waves with respect to time, although each of which will have large fading, this combining results in variation of width of the combined signal to decrease. Thus, reduction of the signal level due to the fading can be reduced.

In general, a correlation bandwidth of the fading differs depending upon multipath environment, about several hundreds KHz to one MHz in the outdoors and about 10 MHz or more in the indoors. On the other hand, the spread bandwidth of CDMA is restricted to several MHz, e.g. 2.0 MHz, or less due to technical problems such as tile limitation of high speed digital signal processing or to the limitation of frequency bandwidth allocated for the system. Thus, in a particular environment such as indoor communication or microcellular radio system in which the correlation bandwidth is wider than the spread bandwidth, the output from the correlator will appear only at one or two taps of the delay line resulting in very small fading reduction by the path diversity function. Namely, in such an environment, the output signal from the receiver will be deteriorated by the short period fading such as Rayleigh fading.

In case that CDMA, especially direct sequence spread spectrum CDMA which will be appropriate to a digital system, is adopted to the mobile radio communication, a near-end to far-end interference, so-called near-far problem, will occur. When a mobile station close to a base station can mask the received signal at the base station, this interference occurs so that the signal from the far-end mobile station is unable to be received by the base station at the same time. This is caused because, in the CDMA cellular mobile communication system, all the stations in the same cell area transmit on the same frequency band. In order to reduce such the near-end to far-end interference, it is necessary to use in the mobile stations a reverse-link power control for controlling transmitting power at the mobile stations so that the power strength of the signals, from all tile mobile stations in the same cell area, received at the base station are the same. Such power control is known by for example "Overview of Cellular CDMA", by William C. Y. Lee, IEEE Transactions on Vehicular Technology, Vol.40, No.2, May 1991.

If the variation of the signal strength is due to only long period variation which will vary depending upon path loss of the received signal given as a function of the path length or upon the degree of shadowing of structures surrounding the stations, the reverse-link power control in the mobile stations is not necessary to be performed in high speed and thus this power control can be easily performed by an open-loop power control system. However, if the aforementioned short period fading is strong, the reverse-link power control should be performed so as to reduce not only the long period variation but also the short period fading.

As is described in detail, although the CDMA systems would in general have the path diversity function at the receiving end to reduce multipath fading, in case of short-distance communication systems such as wireless PBX communication systems or microcellular mobile communication systems, this path diversity due to the spectrum spreading may be ineffective causing the output signal from the receiver to be deteriorated by the short period fading. In order to reduce such short period variation, the reverse-link power control at the mobile units is required to operate rapidly. However, high speed compensation by means of such reverse-link power control will be very difficult and thus, by the power control at the mobile units, sufficient reduction of the short period fading will be unexpected.

SUMMARY OF THE INVENTION

It is therefore an object of the present invention to provide a CDMA communication system which can effectively reduce particularly short period fading.

Another object of the present invention is to provide a CDMA communication system with mobile units having a simple construction.

According to the present invention, a CDMA communication system using spreading codes having a plurality of mobile stations and at least one base station is provided. The mobile stations and the base station are provided with respective receiving sections each of which has a path diversity function for reducing multipath fading. The base station includes an array antenna having a plurality of integrated antenna elements spaced by a distance substantially equal to one to several wavelengths from each other so as to produce a space diversity effect, and a plurality of delay means coupled with the respective antenna elements, for applying time delays to signals which pass through the respective antenna elements. The time delay are different from each other by a one symbol period of the spreading codes or more.

Thus, a CDMA mobile communication system which is quite capable of operating under strong fading environment can be simply formed. In case of an array antenna having four antenna elements located at intervals (one to several wavelengths) with which the variations of signal strength with respect to the respective elements will have no correlation with each other, the fading of 30 dB will be reduced to 10 dB or less by using the maximal-ratio combining method. Furthermore, since the path diversity effect will be involved with the above reduction effect, the system of the present invention can more effectively reduce the fading. Therefore, the short period fading will be reduced to a sufficiently small value causing no compensation of the short period fading by means of the reverse-link power control to be needed. It should be noted that, according to the conventional communication system, this compensation of the short period fading by means of the reverse-link power control has been the most difficult for solving the near-far problem. Consequently, according to the present invention, the constitution of the system can be extremely simplified resulting in a CDMA mobile communication system being expected to be established.

It is preferable that the delay means are formed by optical fiber cables coupled with the respective antenna elements, each length of the optical fiber cables being adjusted so that the difference of the delay between the cables corresponds to a one symbol period of the spreading code or more. As a result, a very simple and also extremely cheap base station can be constituted.

The array antenna has preferably at least two integrated antenna elements spaced by a distance substantially equal to one to several wavelengths from each other so as to produce a space diversity effect.

The receiving section may include a correlator for calculating a correlation between signals received at the receiving section and the spreading code to produce outputs, and a tapped delay line connected to the correlator, for realizing the path diversity function.

The array antenna may be a receiver antenna for receiving signals from the mobile stations, a transmitter antenna for transmitting signals to the mobile stations, or an antenna for receiving and transmitting signals from and to the mobile stations.

Further objects and advantages of the present invention will be apparent from the following description of the preferred embodiments of the invention as illustrated in the accompanying drawings.

BRIEF DESCRIPTION OF THE DRAWINGS

FIG. 6 schematically shows a transmitting and receiving section in the base station as a further embodiment according to the present invention; and FIG. 7 shows an antenna section in the embodiment shown in FIG. 6.

DESCRIPTION OF THE PREFERRED EMBODIMENTS

Figure 1:
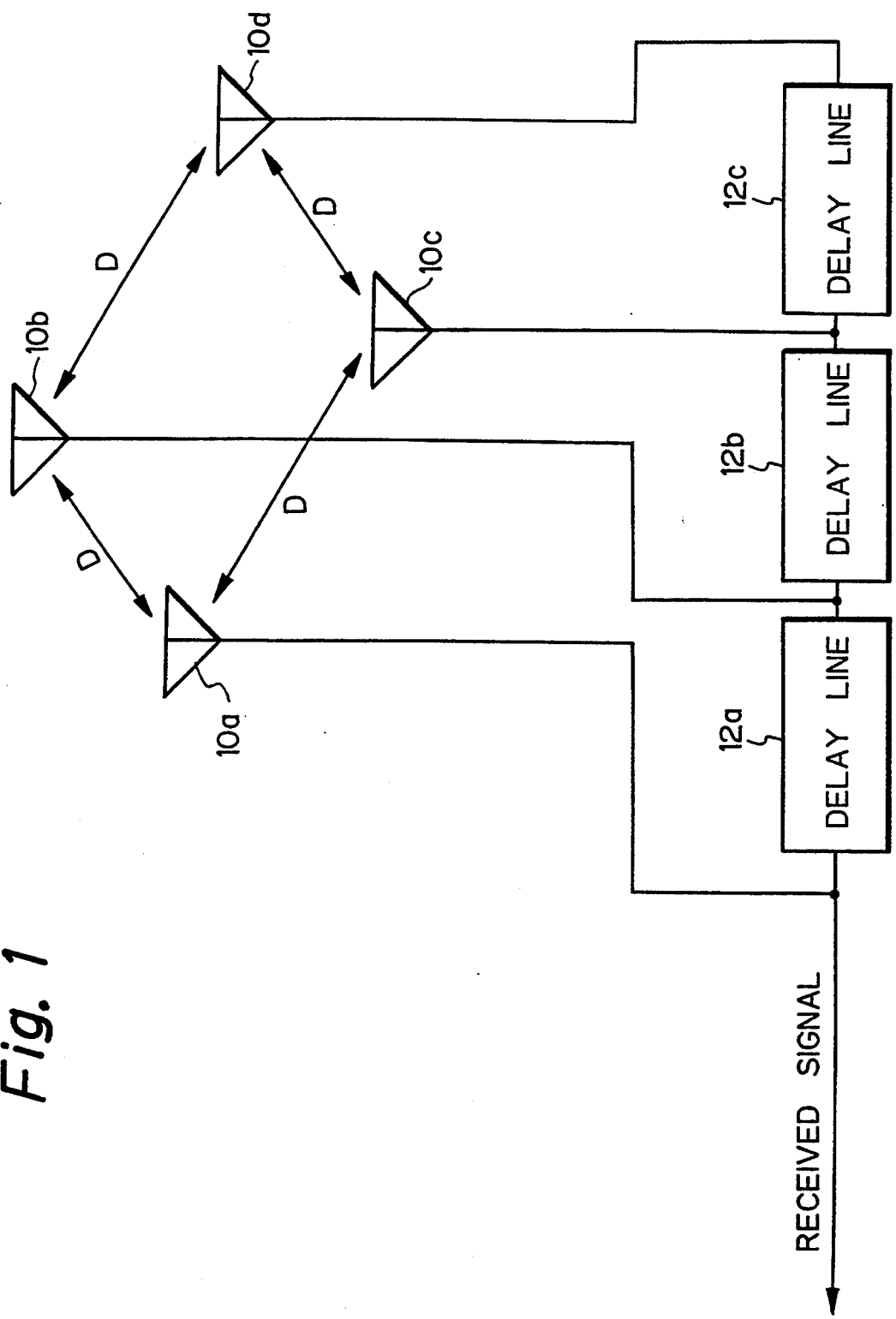
FIG. 1 shows a fundamental construction of an array antenna provided in a base station to illustrate principle of the present invention.

FIG. 1 illustrates a fundamental construction of an array antenna provided in a receiving (transmitting) section of a base station according to the present invention. As shown in this figure, the antenna of tile base station for CDMA mobile communication according to the present invention is constituted by a plurality of (at least two) integrated antenna elements 10a to 10d spaced by a distance D from each other. The distance D is predetermined so that there is no correlation or there is sufficiently small correlation between the strength variations of signals received (to be transmitted) by the respective antenna elements. In practice, this distance D will be for example equal to about one to several wavelengths. Between a receiver (transmitter) and tile respective antenna elements 10a to 10d, delay means for applies time delays which are different each other by a one symbol period of the spreading codes or more. These delay means may be realized for example by means of delay lines 12a to 12c inserted between the antenna elements 10a and 10b, 10b and 10c, and 10c and 10d, respectively.

The above-mentioned delays applied to received signals and/or transmitting signals according to the present invention result to make intentionally a frequency selective fading environment so as to activate the path diversity function of the system thus causing the short period fading to be reduced.

Figure 2:
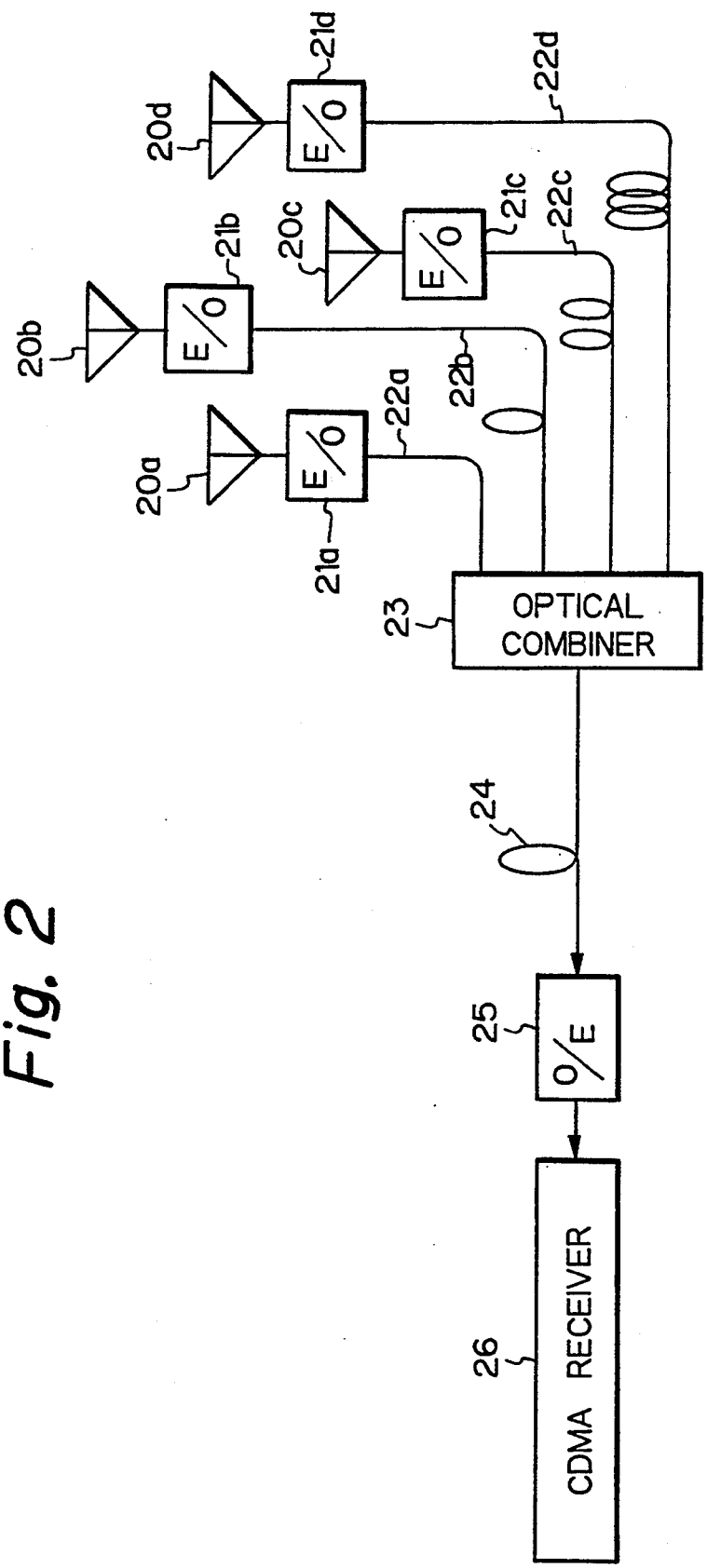
FIG. 2 schematically shows a receiving section in the base station as a preferred embodiment according to the present invention.

FIG. 2 schematically shows a receiving section of a base station as a preferred embodiment according to the present invention. In this embodiment, the delay means are easily realized by using optical fiber feeders.

Figure 3:
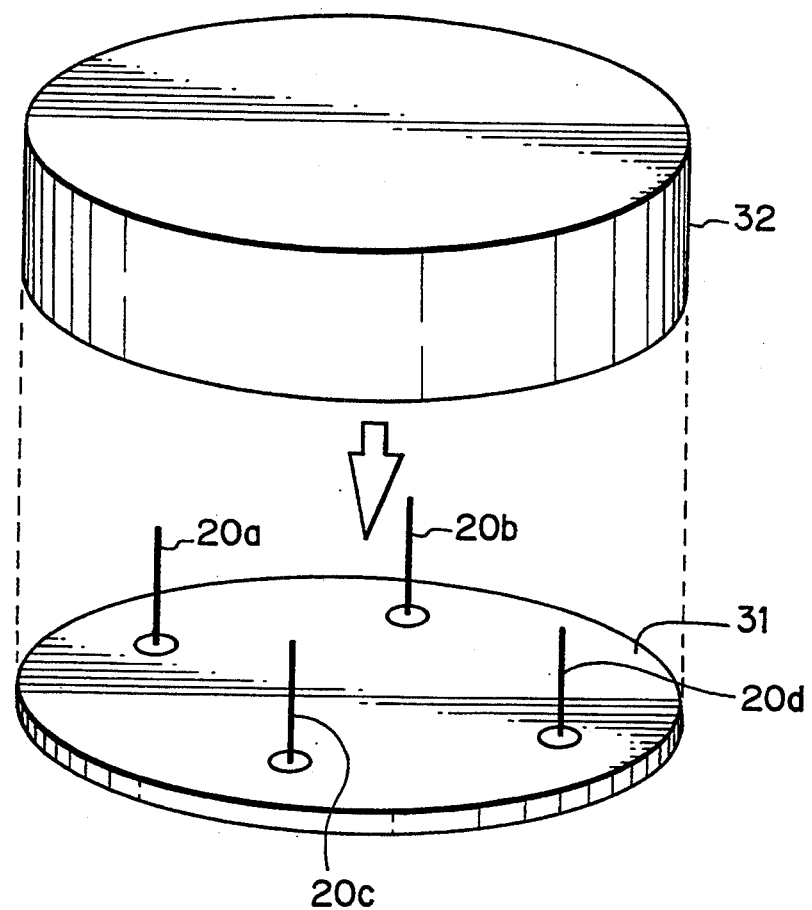
FIG. 3 shows a configuration of an array antenna in the embodiment of FIG. 2.

In FIG. 2, reference numerals 20a to 20d denote antenna elements, integrated together, of a single receiver antenna 30 shown in FIG. 3. The elements 20a to 20d are electrically connected to electro-optical converters (E/O) 21a to 21d, respectively. The converters 21a to 21d are coupled to one ends of optical fiber cables 22a to 22d, respectively whereas the other ends of the cables 22a to 22d are coupled to an optical combiner 23 such as a multiple way star coupler.

The optical fiber cables 22a to 22b function as not only power feeders but also delay means. Delay amount of the respective cables 22a to 22d are set so that the difference of the delay between the adjacent cables corresponds to a one symbol period of the spreading code or more. This delay amount for each of the antenna elements can be set by adjusting the length of the corresponding cable. For example, the time delay of one $\mu$ second will be obtained by about 300 m of the optical fiber cable. In practice, since propagation speed of light in the optical fiber is different from that in free space, this relation between delay and cable length may be modified depending upon the kind of optical fiber used. As the optical fiber cable will be made flexible and its diameter will be small, there is no problem in housing of about one Km long of the optical fiber cable.

The combiner 23 is coupled to an opto-electrical converter (O/E) 25 via an optical fiber cable 24. The converter 25 is electrically connected to a down converter of a CDMA receiver 26.

As shown in FIG. 3, the receiver antenna 30 is a single array antenna with the four integrated antenna elements 20a to 20d fixed on a base plate 31 and with a radome 32 for covering over the elements 20a to 20d and the base plate 31. The distance D between the adjacent elements is predetermined so that there is no correlation or there is sufficiently small correlation between the strength variations of signals received by the respective antenna elements. In practice, this distance D will be for example equal to about one to several wavelengths.

Figure 4:
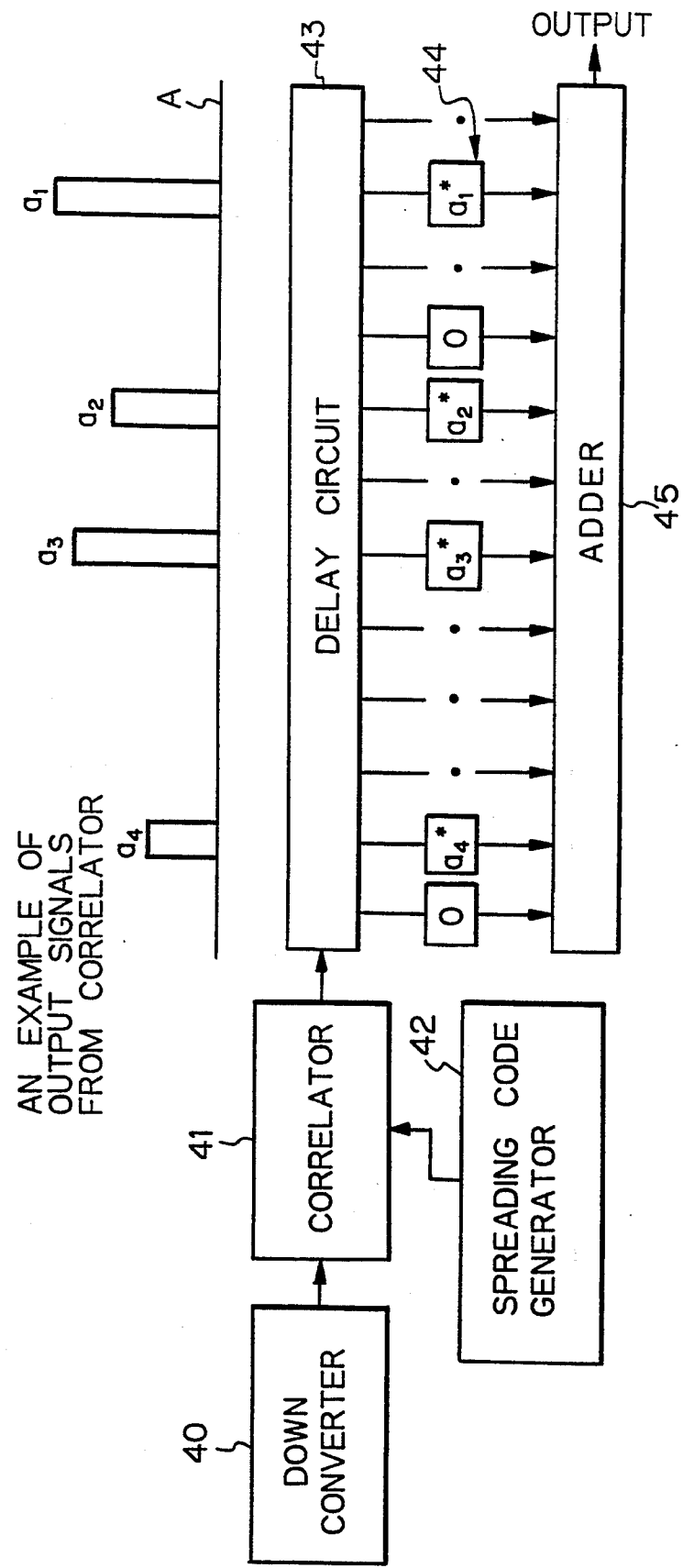
FIG. 4 shows a transversal filter section in the embodiment of FIG. 2.

FIG. 4 schematically shows a transversal filter section of the CDMA receiver 26 in the embodiment of FIG. 2. In the figure, reference numerals 40 denotes the down converter for frequency-converting the received signal from the 0/E converter 25 (shown in FIG. 2) to a base band, and 41 a correlator connected to the down converter 40, for calculating a correlation between the received signal and a spreading PN code fed from a spreading code generator 42, which code is the same as the PN code used for modulating the signal to be transmitted at the particular transmitting end. The output of the correlator 41 is connected to the input of a delay circuit 43 such as a tapped delay line or a delay circuit composed of surface acoustic wave (SAW) devices and amplifiers, having a plurality of output taps. These output taps are connected to an adder 45 via amplifiers 44 for weighting the tap outputs, respectively.

Since a correlation between the received signal and the spreading PN code is calculated by tile correlator 41, output of the correlator will have a resolution of time corresponding to a symbol period of the spreading code. Suppose that four waves $a_1$ to $a_4$ transmitted from the same end and having different delay amounts due to the multipath are received at this base station, four outputs corresponding to the four waves $a_1$ to $a_4$ are appeared at the respective taps as shown in FIG. 4. The amplifiers 44 amplify these outputs $a_1$ to $a_4$ by gains $a_1^*$ to $a_4^*$ as for weighting. The $a_1^*$ to $a_4^*$ are conjugate complex amounts of the signals $a_1$ to $a_4$, respectively. The adder 45 sums up the weighted output From tile amplifiers 44. In other words, the outputs $a_1$ to $a_4$, which appear at certain taps of the delay circuit 43 depending upon the different delay amounts caused by multipath, are weighted by values which are proportional to the estimates of the strength of the respective paths and combined together. This path diversity method called as a maximal-ratio combining method can obtain the best signal to noise ratio by power combining. Since there is no correlation between the variations of the scattered waves with respect to time, although each of which will have large fading, this combining results in the variation of width of the combined signal, which variation may be caused by the fading, to decrease. Thus, reduction of the signal level due to the fading can be reduced.

As mentioned before, in ease of short-distance mobile communication systems such as wireless PBX communication systems or microcellular mobile communication systems, the delay differences between the different paths of the received signal are very small. Therefore, according to the conventional systems, the outputs from the delay circuit will appear at only one tap or two adjacent taps thereof resulting in the fading in the received signal cannot be reduced. Thus, the output signal from the receiver will have large variation of the signal strength (short period variation such as so called Rayleigh fading) with a rate corresponding to the moving speed of the mobile transmitting end of the short period fading.

However, according to the present invention as will be described hereinafter, predetermined delays are artificially applied to received signals before applying them to the path diversity section resulting in intentionally making a frequency selective fading environment.

The antenna elements 20a to 20d shown in FIG. 2 will receive radio waves from a mobile transmitting end via the multipath. The strength of signals received by the respective antenna elements 20a to 20d will have the aforementioned short period variations. The longer distance interval D between the antenna elements, the smaller correlation between the variations of the received signals. In this embodiment, each of the intervals D between tile antenna elements 20a and 20b, between the antenna elements 20b and 20c, and between antenna elements 20c and 20d is set to a value equal to one to several wavelengths or more. It is known that if the space interval between diversity antennas at the base station is one to several wavelengths or more, there is sufficiently small correlation between the strength variations of the received signals ("Correlation Coefficient on Base Station Diversity for Land Mobile Communication System", by S. Kozono and S. Sakagami, Japanese Electronics and Communication Paper Vol. J70-B, No. 4, April 1987).

Delay amount difference of the cable 22b with respect to the cable 22a is set to a spatial length corresponding to about a one symbol period of the spreading code. Namely, the delay difference may be set to 0.5 $\mu$seconds under 2 MHz clocks by adjusting the length of the cable 22b. As a result, the signal received by the antenna element 20b will appear at a tap (or taps) of the delay circuit 43, which tap is (or taps are) deviated by one tap from the tap (or taps) at which the signal received by the antenna element 20a will be output. Similar to this, delay difference between the cables 22b and 22c, and difference between the cables 22c and 22d are set to about a one symbol period of the spreading code, causing the outputs of the delay circuit 43, corresponding the signals received by the respective antenna elements, to deviate by one tap, respectively. Of course, there is no correlation or there is sufficiently small correlation between the strength variations of signals received by the respective antenna elements 20a to 20d.

Since, according to the embodiment, the outputs from the delay circuit 43 will be appear at four or more taps apart from each other, the fading in the received signal can be effectively reduced by the path diversity (RAKE or PDI) function. Thus, variation of the output signal from the receiver can be depressed so as to reduce the short period fading.

The number of the antenna elements of an array antenna can be selectively determined to be five or more. The more the number of the elements, the more the short period fading is effectively reduced.

Each of antenna elements of an array antenna may be located along a circle having a radius corresponding to several wavelengths at a predetermined interval.

Figure 5:
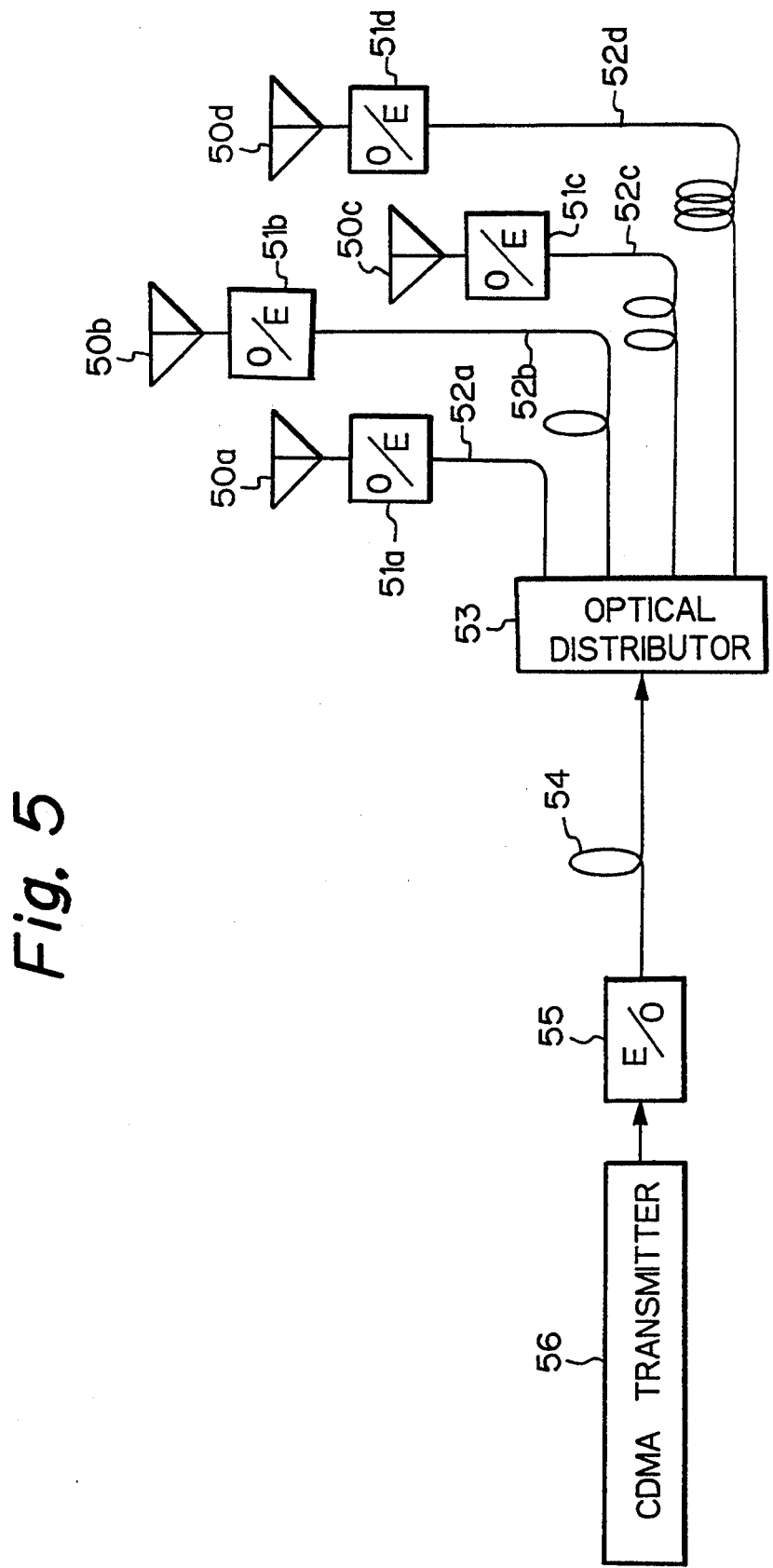
FIG. 5 schematically shows a transmitting section in the base station as another embodiment according to the present invention.

FIG. 5 schematically shows a transmitting section of a base station as another embodiment according to the present invention.

In FIG. 5, reference numerals 50a to 50d denote antenna elements, integrated together, of a single transmitter antenna which has the same constitution as the array antenna 30 shown in FIG. 3. The elements 50a to 50d are electrically connected to opto-electrical converters (O/E) 51a to 51d, respectively. The converters 51a to 51d are coupled to one of the respective ends of optical fiber cables 52a to 52d, whereas the other ends of the cables 52a to 52d are coupled to an optical distributor 53 such as a multiple way star coupler.

The optical fiber cables 52a to 52b function as not only power feeders but also delay means. Delay amount of the respective cables 52a to 52d are set so that the difference of the delay between the adjacent cables corresponds to a one symbol period of the spreading code or more. This delay amount for each of the antenna elements can be set by adjusting the length of the corresponding cable. For example, the time delay of one $\mu$ second will be obtained by about 300 m of the optical fiber cable. In practice, since propagation speed of light in the optical fiber is different from that in free space, this relation between delay and cable length may be modified depending upon the kind of optical fiber used. As the optical fiber cable will be made flexible and its diameter will be small, there is no problem in housing of about one Km long of the optical fiber cable.

The distributor 53 is coupled to an electro-optical converter (E/O) 55 via an optical fiber cable 54. The converter 55 is electrically connected to an up converter of a CDMA transmitter 56.

As will be apparent from FIG. 5, in this embodiment, the constitution and function of the transmitting section of the base station is substantially the same as those of the receiving section in the embodiment of FIG. 2. The fading on the signals transmitted from the base station to each mobile station will be reduced by a path diversity function provided in a receiving section of the mobile station similar to the embodiment of FIG. 2.

It should be noted that both the receiving section and the transmitting section of the base station may be formed as the embodiments of FIGS. 2 and 5, respectively. In that case, the fading can be reduced both for receiving signals at the base station and for receiving signals at the mobile station.

The number of the antenna elements of an array antenna can be selectively determined to be five or more. The more the number of the elements, the more the short period fading is effectively reduced.

Each of antenna elements of an array antenna may be located along a circle having a radius corresponding to several wavelengths at a predetermined interval.

FIG. 6 schematically shows a receiving and transmitting section of a base station as a further embodiment according to the present invention, and FIG. 7 shows an antenna section of the embodiment of FIG. 6. In this embodiment, the CDMA system according to the present invention is used in a microcellular type urban mobile communication. At a center of each of the maicrocells, a base antenna formed by a single array antenna for receiving and transmitting signals is located. This constitution may be applied to a wireless PBX.

In FIGS. 6 and 7, reference numerals 60a to 60d denote optical power feeding type antenna sections integrated as a single array antenna, used for both transmitting and receiving signals. As shown in FIG.7, each of the antenna sections 60a to 60b is composed of an antenna element 70, transmitting and received wave divider 71 electrically connected to the element 70, an electro-optical converter (E/0) 72 electrically connected to the divider 71, and an opto-electrical converter (O/E) 73 also electrically connected to the divider 71.

The antenna sections 60a to 60d are optically coupled to one ends of optical fiber cables 61a to 62d and 62a to 62d, respectively whereas the other ends of the cables 61a to 61d are coupled to an optical combiner 63 such as a multiple way star coupler, and the other ends of the cables 62a to 62d are coupled to an optical distributor 64 such as a multiple way star coupler.

The optical fiber cables 61a to 61b and 62a to 62d function as not only power feeders but also delay means. Delay amount of the respective cables are set so that the difference of the delay between the adjacent cables corresponds to a one symbol period of the spreading code or more. This delay amount for each of the antenna elements can be set by adjusting the length of the corresponding cable. For example, the time delay of one $\mu$ second will be obtained by about 300 m of the optical fiber cable. In practice, since propagation speed of light in the optical fiber is different from that in free space, this relation between delay and cable length may be modified depending upon the kind of optical fiber used. As the optical fiber cable will be made flexible and its diameter will be small, there is no problem in housing of about one Km long of the optical fiber cable.

The combiner 63 is coupled to an opto-electrical converter (0/E) 661 in a switching device 66 via an optical fiber cable 65. The converter 661 is electrically connected to a down converter of a CDMA receiver 662 in the switching device. The distributor 64 is coupled to an electro-optical converter (E/O) 663 in the switching device 66 via an optical fiber cable 67. The converter 663 is electrically connected to a down converter of a CDMA receiver 664 in the switching device.

As will be apparent from FIGS. 6 and 7, in this embodiment the antenna sections 60a to 60d are commonly used in transmitting and receiving signals. The constitution and function of the transmitting section and the receiving section of the base station is substantially the same as those of the sections in the embodiments of FIGS. 2 and 5. The fading on the signals transmitted from the base station to each mobile station will be reduced by a path diversity function provided in a receiving section of the mobile station.

The number of the antenna elements of an array antenna can be selectively determined to be five or more. The more the number of the elements, the more the short period fading is effectively reduced.

Each of antenna elements of an array antenna may be located along a circle having a radius corresponding to several wavelengths at a predetermined interval or may be distributed on a straight line.

Many widely different embodiments of the present invention may be constructed without departing from the spirit and scope of the present invention. It should be understood that the present invention is not limited to the specific embodiments described in the specification, except as defined in the appended claims.

What is claimed is:

1. A CDMA communication system using spreading codes, said system having a plurality of mobile stations and at least one base station, said mobile stations and said base station provided with respective receiving sections each of which has a path diversity function for reducing multipath fading, said base station comprising:

an array antenna having a plurality of integrated antenna elements spaced by a distance substantially equal to one to several wavelengths from each other so as to produce a space diversity effect; and a plurality of delay means coupled with said respective antenna elements, for applying time delays to signals which pass through said respective antenna elements, said time delay being different from each other by a one symbol period of the spreading codes or more.

2. A system as claimed in claim 1, wherein said delay means are formed by optical fiber cables coupled with said respective antenna elements, each length of the optical fiber cables being adjusted so that the difference of the delay between the cables corresponds to a one symbol period of the spreading code or more.

3. A system as claimed in claim 1, wherein said receiving section includes a correlator for calculating a correlation between signals received at said receiving section and a spreading code assigned to a particular mobile station, and a tapped delay line connected to said correlator, for realizing the path diversity function.

4. A system as claimed in claim 2, wherein said array antenna is a receiver antenna for receiving signals from said mobile stations, wherein said base station includes electro-optical converters inserted between said respective antenna elements and one ends of said respective optical fiber cables, an optical combining means coupled with the other ends of said optical fiber cables, and an opto-electrical converter coupled with said optical combining means.

5. A system as claimed in claim 4, wherein said base station further includes a correlator for calculating a correlation between signals fed from said opto-electrical converter and a spreading code used for modulating signals to be transmitted at a particular mobile station, and a tapped delay line connected to said correlator, for realizing the path diversity function.

6. A system as claimed in claim 2, wherein said array antenna is a transmitter antenna for transmitting signals to said mobile stations, wherein said base station includes opto-electrical converters inserted between said respective antenna elements and one ends of said respective optical fiber cables, an optical distributing means coupled with the other ends of said optical fiber cables, and a electro-optical converter coupled with said optical distributing means.

7. A system as claimed in claim 2, wherein said array antenna is an antenna for receiving and transmitting signals from and to said mobile stations, wherein said base station includes first electro-optical converters inserted between said respective antenna elements and one ends of respective first set of said optical fiber cables, an optical combining means coupled with the other ends of said first set of said optical fiber cables, a first opto-electrical converter coupled with said optical combining means, second opto-electrical converters inserted between said respective antenna elements and one ends of respective second set of said optical fiber cables, an optical distributing means coupled with the other ends of said second set of said optical fiber cables, and a second electro-optical converter coupled with said optical distributing means.

8. A system as claimed in claim 7, wherein said base station further includes a correlator for calculating a correlation between signals fed from said first opto-electrical converter and a spreading code used for modulating signals to be transmitted at a particular mobile station, and a tapped delay line connected to said correlator, for realizing the path diversity function.

9. A base station for a CDMA communication system using spreading codes, said system having a plurality of mobile stations, said base station provided with a receiving section which has a path diversity function for reducing multipath fading, comprising:

an array antenna having a plurality of integrated antenna elements spaced by a distance substantially equal to one to several wavelengths from each other so as to produce a space diversity effect; and a plurality of delay means coupled with said respective antenna elements, for applying time delays to signals which pass through said respective antenna elements, said time delay being different from each other by a one symbol period of the spreading codes or more.

10. A base station as claimed in claim 9, wherein said delay means are formed by optical fiber cables coupled with said respective antenna elements, each length of the optical fiber cables being adjusted so that the difference of the delay between the cables corresponds to a one symbol period of the spreading code or more.

11. A base station as claimed in claim 9, wherein said receiving section includes a correlator for calculating a correlation between signals received at said receiving section and a spreading code assigned to a particular mobile station, and a tapped delay line connected to said correlator, for realizing the path diversity function.

12. A base station as claimed in claim 10, wherein said array antenna is a receiver antenna for receiving signals from said mobile stations, wherein said base station includes electro-optical converters inserted between said respective antenna elements and one ends of said respective optical fiber cables, an optical combining means coupled with the other ends of said optical fiber cables, and an opto-electrical converter coupled with said optical combining means.

13. A base station as claimed in claim 12, wherein said base station further includes a correlator for calculating a correlation between signals fed from said opto-electrical converter and a spreading code used for modulating signals to be transmitted at a particular mobile station, and a tapped delay line connected to said correlator, for realizing the path diversity function.

14. A base station as claimed in claim 10, wherein said array antenna is a transmitter antenna for transmitting signals to said mobile stations, wherein said base station includes opto-electrical converters inserted between said respective antenna elements and one ends of said respective optical fiber cables, an optical distributing means coupled with the other ends of said optical fiber cables, and a electro-optical converter coupled with said optical distributing means.

15. A base station as claimed in claim 10, wherein said array antenna is an antenna for receiving and transmitting signals from and to said mobile stations, wherein said base station includes first electro-optical converters inserted between said respective antenna elements and one ends of respective first set of said optical fiber cables, an optical combining means coupled with the other ends of said first set of said optical fiber cables, a first opto-electrical converter coupled with said optical combining means, second opto-electrical converters inserted between said respective antenna elements and one ends of respective second set of said optical fiber cables, an optical distributing means coupled with the other ends of said second set of said optical fiber cables, and a second electro-optical converter coupled with said optical distributing means.

16. A base station as claimed in claim 15, wherein said base station further includes a correlator for calculating a correlation between signals fed from said first opto-electrical converter and a spreading code used for modulating signals to be transmitted at a particular mobile station, and a tapped delay line connected to said correlator, for realizing the path diversity function.

17. An antenna section in a base station of a CDMA communication system using spreading codes, said system having a plurality of mobile stations, said mobile stations and said base station provided with respective receiving sections each of which has a path diversity function for reducing multipath fading, comprising:

an array antenna having a plurality of integrated antenna elements spaced by a distance substantially equal to one to several wavelengths from each other so as to produce a space diversity effect; and a plurality of delay means coupled with said respective antenna elements, for applying time delays to signals which pass through said respective antenna elements, said time delay being different from each other by a one symbol period of the spreading codes or more.

18. An antenna section as claimed in claim 17, wherein said delay means are formed by optical fiber cables coupled with said respective antenna elements, each length of the optical fiber cables being adjusted so that the difference of the delay between the cables corresponds to a one symbol period of the spreading code or more.

* * * * *